United States Patent
Bubik

[11] 3,897,879
[45] Aug. 5, 1975

[54] VEHICLE TOWING APPARATUS
[75] Inventor: Leslie Bubik, Toronto, Canada
[73] Assignee: Vulcan Equipment Company Limited, Toronto, Canada
[22] Filed: Aug. 13, 1973
[21] Appl. No.: 387,664

[30] Foreign Application Priority Data
June 26, 1973 Canada ............... 174907

[52] U.S. Cl. .................... 214/86 A; 280/402
[51] Int. Cl. ............................. B60p 3/12
[58] Field of Search ...... 214/86 A, 396, 141, 146.5; 280/402, 493; 254/139.1

[56] References Cited
UNITED STATES PATENTS

| | | | |
|---|---|---|---|
| 2,283,443 | 5/1942 | Klein | 214/86 A |
| 2,541,582 | 2/1951 | Hawkins | 214/86 A |
| 3,182,829 | 5/1965 | Wagner | 214/86 A |
| 3,478,894 | 11/1969 | Stauffer | 214/141 X |
| 3,690,482 | 9/1972 | Gaumont | 280/402 X |

*Primary Examiner*—Robert J. Spar
*Assistant Examiner*—Donald W. Underwood

[57] ABSTRACT

A vehicle towing apparatus is provided which includes a cantilever mounted extendable boom with a swivable connection to a vehicle-engaging cradle. The cantilever reduces the necessary weight of the towing vehicle and the extendable feature permits the towed vehicle to be secured in a much closer stable relationship to the towing vehicle than heretofore. The swivel connection to the vehicle-engaging apparatus permits a wide range relative position between the towing vehicle and the towed vehicle which permits lifting and towing in situations where there is relatively little manoeuvrability.

4 Claims, 4 Drawing Figures

VEHICLE TOWING APPARATUS

This invention relates to vehicle towing mechanisms.

The towing of vehicles presents problems in various areas: connecting the vehicle to be towed to the towing vehicle, towing the vehicle, and disconnecting the towed vehicle.

Of these three areas the first two present the greater problems and of these the first, more. The problems in the connection of the vehicle to be towed arise from the position of the vehicle and its design. When cars are closely parked with present equipment, the operation is tedious and clumsy. With some types of equipment it is impossible; with others it is not practical without some damage to the vehicle to be towed. As is now the common case cars are parked on streets so close that if a car has to be removed either because of mechanical failure or because of a traffic violation a towing vehicle cannot remove the vehicle without considerable manoeuvring and loss of time, if indeed the connection can be made.

The actual making of a physical connection between a towing vehicle and the vehicle to be towed in such a situation also presents considerable problems, automobiles are now provided with shock-absorbing bumper structures. These structures cannot support any great vertical forces so that the former practice of towing by connection or support to or by the bumpers cannot be followed. And it is also extremely difficult for the towing vehicle operator to make the connection.

The second major area of problems previously mentioned is in the area of the actual towing. The standard practice requires the vehicle to be secured at a fixed distance from the towing vehicle. This prevents bumping between the vehicles. However, the present boom design and tow-bar structures are limited with respect to the proximity which may be achieved between the vehicles. As a consequence to counterbalance the towed vehicle the towing vehicle has to be provided with excess weight greater than is the case with the structure of the present invention.

To overcome these various shortcomings in the structures of the prior art it is accordingly the principal object of the present invention to provide an improved towing assembly for vehicles which will permit more facile connection to the vehicle to be towed, will permit more manoeuvrability, and be more economical to operate and in capital cost.

In accordance with these objectives there is provided in accordance with the present invention a towing apparatus for lifting and towing vehicles to be towed comprising in combination:

a boom support adapted to be mounted on a towing vehicle adjacent the rear end thereof;

a boom of variable length pivotally mounted on said boom support for movement about a horizontal axis;

first power means for moving said boom about said axis;

flexible sling support means swivably and removably connected to said boom;

rigid means securable to said sling support, said towed vehicle and said towing vehicle to lift and tow said towed vehicle;

and second power means for varying the length of said boom whereby an adjacent end of a towed vehicle may be secured above the rear end of the towing vehicle.

The objectives of and the advantages flowing from towing systems in accordance with the present invention will be more fully understood from the drawings and the following description in which a specific embodiment is illustrated by way of example and in which.

Figure 1:
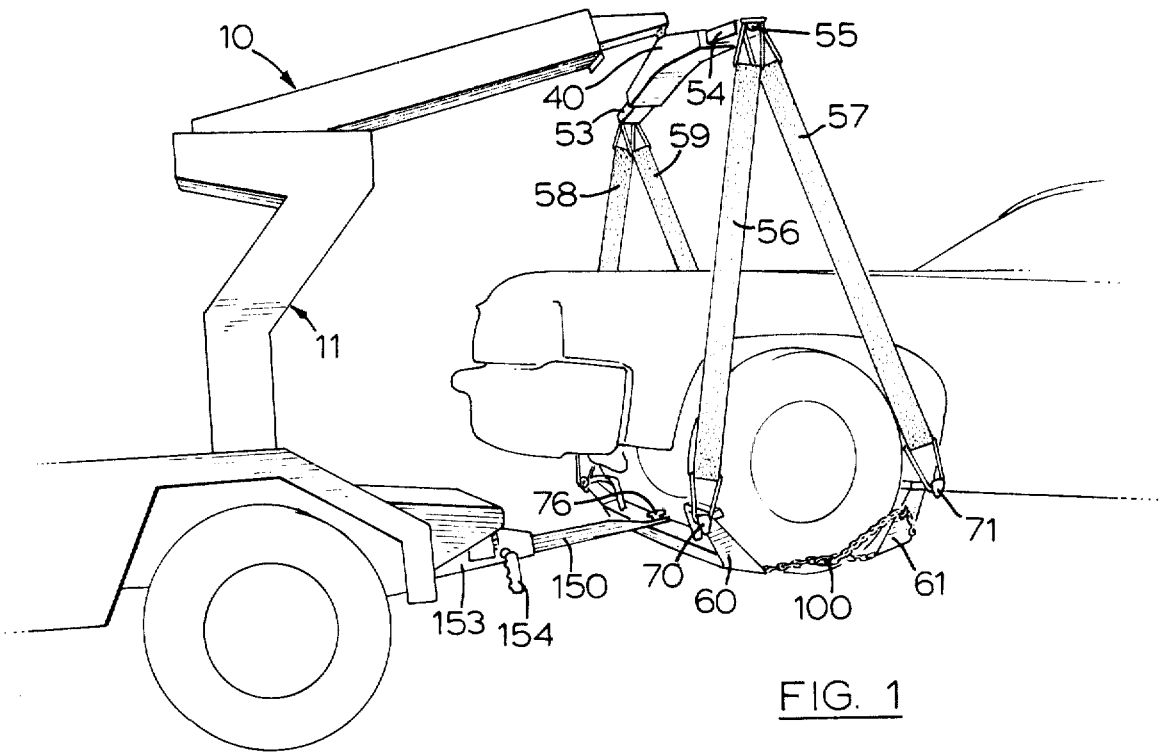
FIG. 1 is an illustration of the front of a vehicle being towed by a tow truck, the rear end of which is shown employing a towing system in accordance with the present invention and serves to illustrate the relationship and attitude of the two vehicles.

Referring now to the drawings a towing system in accordance with the present invention is generally indicated at 10 and comprises a boom support 11 which is suitably secured to the rear chassis of a truck or similar vehicle adjacent the rear end thereof.

The boom support is hollow being fabricated of box-section steel. It has a lower base part 12 from the step of which an arm 13 extends rearwardly away from the tow truck cab at an angle as shown. From the top of the arm 13 a third part 14, providing a seating and mounting for a boom 15, extends toward the cab of the tow truck as shown. The upper edge of the arm 13 forms a rest for the boom 15.

Boom 15 comprises a pair of members 22 and 23, an outer member and an inner member, respectively, with member 23 being mounted to telescopically extend and retract within member 22 on rollers such as 24. Further guide means to ensure movement and obviate binding between these members may also be provided.

Member 23 has a free end with a hook 32 and is connected intermediate its length by a pin 25 to a piston 26 of cylinder 27. The remote end of cylinder 27 is pivotally mounted to flanges such as 29. These flanges are in turn pivotally connected by pin 52 to the third part 14 of the boom support as shown.

Intermediate the length of member 22 there is also provided a second pair of downwardly extending flanges 16 which are pivotally connected through pin 50 to the adjacent end of piston 17 of hydraulic cylinder 18 in the manner shown.

The lower end of cylinder 18 is pivotally mounted on a pin 51 mounted on the boom support.

The hydraulic fluid supply to cylinders 18 and 27 are provided through lines 20 and 30 respectively. It will, of course, be understood that suitable controls are provided on each line to operate the cylinders and their respective pistons.

The vehicle-engaging part of the present system comprises a beam 40 having a central swivel eye 101. Beam 40 may be provided with laterally extending telescopic arms such as 53 and 54 in FIG. 1, one on each side, on the outer ends of which further hooks 55 are provided. These hooks engage slings such as 56 and 57, on the one side, and 58 and 59 on the other. The lower ends of the slings are connected by suitable fastening means to hooks or projections, one at the front, 70, and one at the rear, 71, of their respective front or rear, as the case may be, wheels, on vehicle-engaging members such as 60 and 61 in FIGS. 1 and 2, or 62 in FIG. 4.

The wheel-engaging member 60 comprises a bar 72 which, when in use, extends transversely of the vehicle to be towed. An inclined plate 73 extending towards the wheel is provided adjacent either end of bar 72 and from the upper surface there extends again at either end, frames such as 74 and 75. The plates and frame provide wheel-engaging surfaces. Also on bar 72 a key 76 is mounted as shown.

The wheel-engaging member 61 is a mirror-image of the wheel-engaging member 60 with the omission of key 76.

The embodiment of the vehicle-engaging member 64 shown in FIG. 4, again comprises a transverse bar 80 of adjustable length. Bar 81 is telescopically engageable with a channel member 82 and the relationship may be varied by removing the locking pin 83 or key moving the two parts bar 81 and channel 82 to the necessary length and replacing the key. At either end of bar 80 a pair of lateral bars 85 and 86 are rigidly secured. These bars provide mounting surfaces for the hooks or projections 70 and 71. Inward of the ends of bar 80 there is mounted approximately one wheel width from their respective ends plates 87 and 88 to extend in the same direction as their respective lateral bars. The outer edges of these plates are provided with surfaces converging towards the main axis of the car and the upper surfaces are provided with rubber pads.

The foregoing description has related only to the structure and the mode of operation will now be described.

As mentioned previously towing vehicles with the new shock-absorbing bumpers presents considerable difficulty. However, there is difficulty in hooking up a vehicle to be towed be it old or new. The tow truck operator has with present types of equipment to get down on the road to make connection and where the vehicle to be towed is in a "tight" spot, has to make many manoeuvres with his tow truck to remove the vehicle to be towed.

Figure 2:
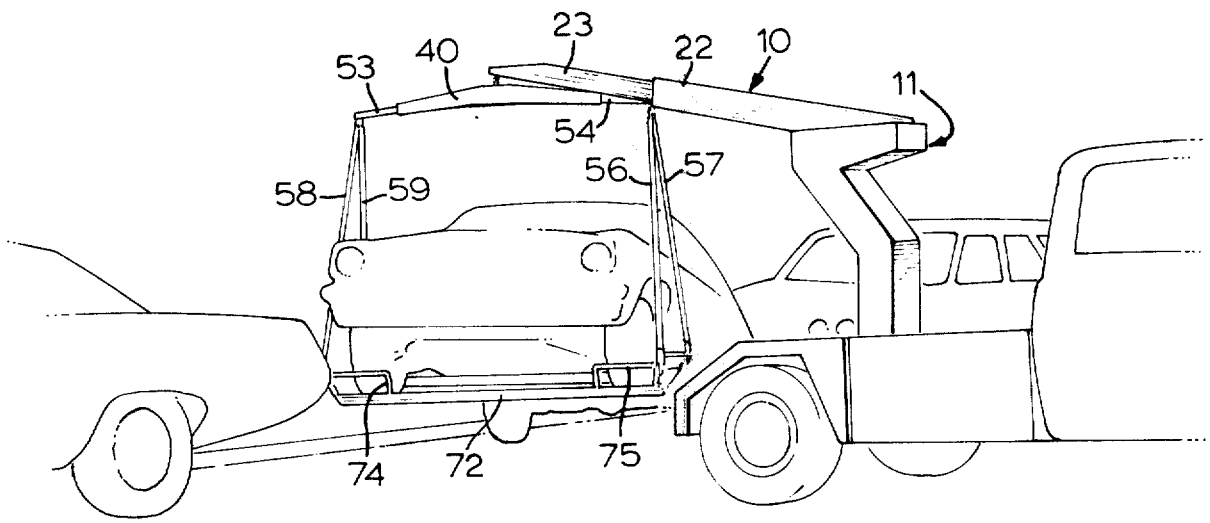
FIG. 2 is an illustration of a tow truck embodying a towing system in accordance with the present invention in the process of moving a car.
Figure 3:
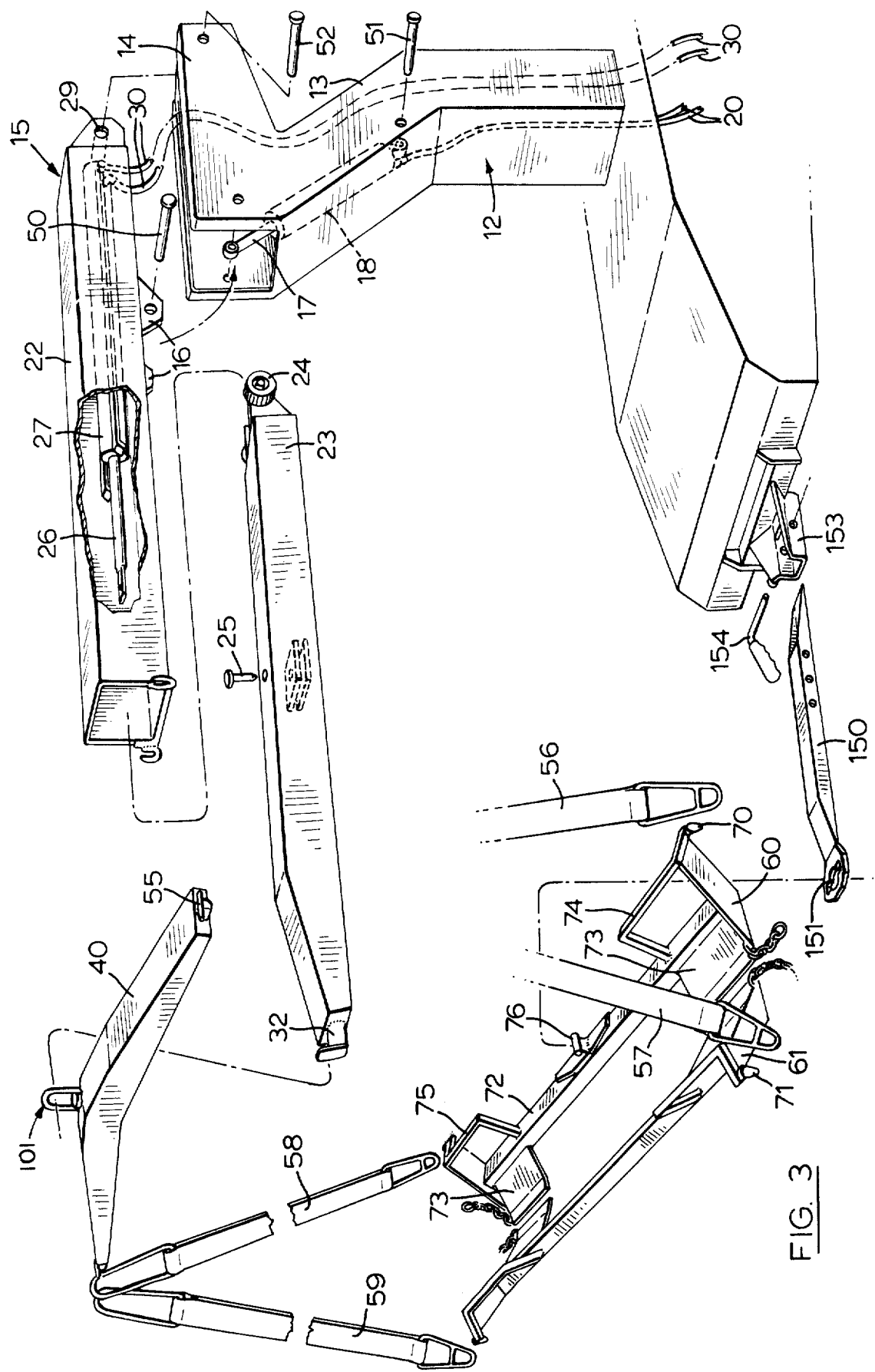
FIG. 3 is an exploded perspective view of the several components of a towing system in accordance with the present invention with part in fragmentary aspect and serves to illustrate the relationship between these components.

As shown in FIGS. 1 and 2 the structure of the present invention reduces the manoeuvring considerably and facilitates the connection and movement of the towed vehicle with facility.

When the operator arrives to remove a vehicle from an "end-on" relationship, vehicle-engaging members such as 60 and 61 or 62 are placed in position under the front wheels, one in front and one at the rear thereof and secured together by chains such as 100 over the hooks so that plates 73 and frames 74 are held in engagement with the opposed tire surfaces. The same procedure is followed if the rear wheels are to be raised.

Slings 56, 57, 58 and 59 are then connected to their respective hooks such as 70 and 71 on their respective sides of the automobile and connected to the adjacent ends of beam 40 which, as mentioned previously, may be of adjustable length to accommodate varying widths of automobile.

Swivel eye 101 on beam 40 is engaged with hook 32.

At this point, member 23 will be in an extended position relative to member 22 and the boom 15 will be in a lowered attitude. The controls on line 20 are actuated, piston 17 is extended and as it extends, boom 15 is caused to rotate about the pivot 52.

It is to be noted that the boom 15 is cantilevered so that the moment of the car about the boom support is reduced when compared to conventional boom. This effect reduces the total necessary weight of the tow truck to counterbalance the weight of the automobile to be towed during the towing process.

As the vehicle is raised or when raised to the final towing height a tow bar 150 with a terminal keyway 151 is engaged with the key 76 on bar 72 and locked by turning.

The controls on line 30 are then actuated to retract piston 26 and pull boom member 23 inward of member 22. With this movement the automobile to be towed is pulled toward the towing vehicle. At the same time bar 150 is engaged with a channel 153 and locked in position by a pin 154 which is pushed through aligned holes in channel 153 and the tow bar 150.

As the boom 15 is retracted the adjacent end of the vehicle will be pulled in so that it is over or very close to the rear end of the towing vehicle. This relative position also minimizes the weight of the towing vehicle and enhances the steering and towing facility of the towing vehicle.

It will, of course, be understood that the hydraulic system controls are such that when released the pistons and cylinders are fixed in their final actuated position.

When the vehicle to be towed is in a "tight" spot as shown in FIG. 2 the towing vehicle is manoeuvred into a suitable position, inclined to the automobile to be towed.

Again the engagement between bars 72 and the vehicle wheels are effected. The swivel connection between beam 40 and the boom 15 permits beam 40 to be swung through a large angle and the beam 40 and its associated slings will straddle the automobile to be towed in the manner shown in FIG. 2.

The vehicle to be towed can then be raised vertically as shown in FIG. 2, and as the tow truck moves forward, swung about its rear wheels until the truck and towed vehicle are aligned. Boom 15 is then retracted and engagement between the tow truck and the towed vehicle made fast by tow bar 150.

Figure 4:
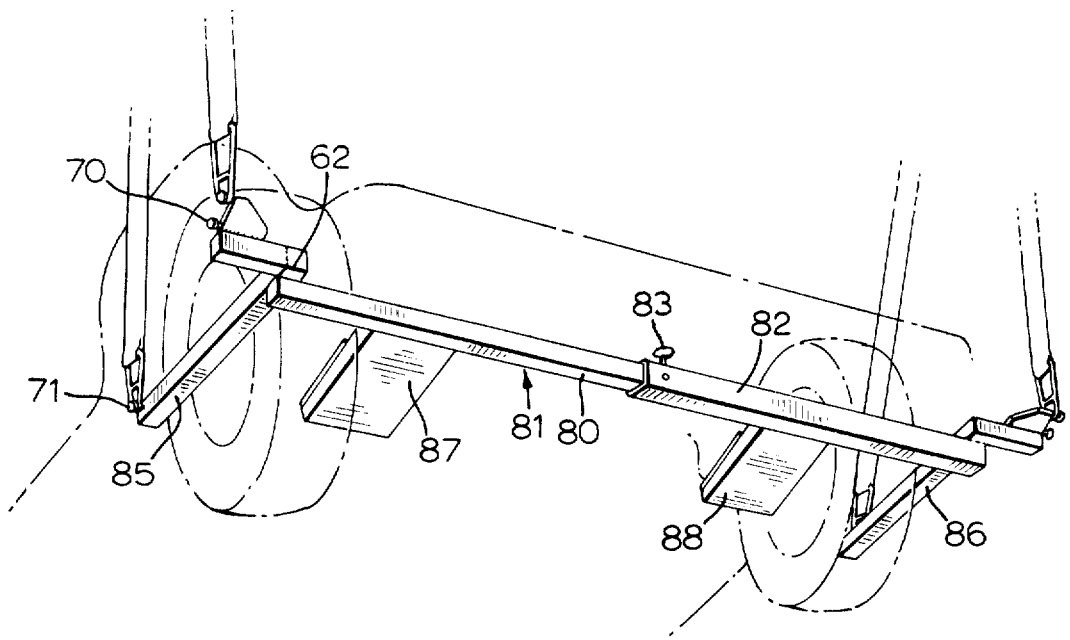
FIG. 4 is a perspective view from the bottom of an alternative wheel-engaging means in accordance with the present invention.

When the embodiment of the wheel or vehicle-engaging means illustrated in FIG. 4 is employed substantially the same procedure is followed in lifting and securing the towing vehicle and towed vehicle.

As previously mentioned bar 80 is placed in front of the car with the areas defined by bars 85 and 86 and the plates 87 and 88 aligned with their respective wheels. The slings are again connected and as the boom is raised the wheels are either wedged due to the diverging outer surfaces of plates 87 and 88, or plates 87 and 88 will move up to engage the underside of the vehicle. However, it has been found that this latter arrangement by the action and reaction between the vehicle to be towed and the lifting bar a secure connection is effected.

From the foregoing description it will be evident that the towing apparatus employed enables very easy connections to be made between the towing vehicle and the towed vehicle. It will also be evident that this structure is during the lifting and towing operation more stable.

What I claim is:

1. Apparatus for lifting and towing vehicles comprising:

a boom support adapted to be mounted on a towing vehicle, a boom of variable length pivotally mounted on said boom support for movement about a horizontal axis, said boom being positionable to extend from the rear end of the towing vehicle, sling support means connected to the boom, flexible sling means connected to and depending from said sling support means, a rigid member extendable across and beneath a vehicle to be towed and engageable with said towed vehicle, means on said rigid member and on said sling means for securing said rigid member to said sling means forwardly and rearwardly of the wheels and outwardly thereof at one end of the towed vehicle, first power means for moving said boom about said axis to lift said one end of the towed vehicle off the ground when said rigid member is secured to said sling means by said securing means, second power means for varying the length of said boom so as to move said lifted one end of said towed vehicle towards the towing vehicle, and a rigid tow bar connectible between said rigid member and said towing vehicle.

2. Towing apparatus according to claim 1 wherein said rigid member is engageable with said towed vehicle wheels forwardly thereof, and including a further rigid member extendable across the towed vehicle and engageable with said towed vehicle wheels rearwardly thereof, said means on said rigid member and on said sling means being operable to secure said rigid members in engagement with said wheels and said sling means.

3. Towing apparatus according to claim 1 wherein said sling support means includes a beam swivably carried by the boom and positionable transversely across and over the towed vehicle, and said sling means includes flexible elements extending downwardly from each opposite end of the beam down to said securing means.

4. Towing apparatus according to claim 1 wherein said rigid member is engageable with said towed vehicle wheels forwardly thereof, and including a further rigid member extendable across the towed vehicle and engageable with said towed vehicle wheels rearwardly thereof, said sling support means including a beam swivably carried by the boom and positionable transversely across and over the towed vehicle, and said sling means including a pair of flexible elements extending downwardly from each opposite end of the beam for engagement with the respective rigid members by said securing means.

* * * * *